(12) United States Patent
Abe et al.

(10) Patent No.: US 10,823,274 B2
(45) Date of Patent: Nov. 3, 2020

(54) CASE COMPONENT OF TRANSAXLE

(71) Applicants: TOYOTA JIDOSHA KABUSHIKI KAISHA, Toyota-shi (JP); AISIN AW CO., LTD., Anjo-shi (JP)

(72) Inventors: Tomohiro Abe, Toyota (JP); Hiroaki Kimura, Toyota (JP); Hiroto Hashimoto, Atsugi (JP); Takayuki Teramoto, Nissin (JP); Eita Hamada, Seto (JP); Fumiaki Shigematsu, Anjo (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 67 days.

(21) Appl. No.: 16/284,109

(22) Filed: Feb. 25, 2019

(65) Prior Publication Data

US 2019/0293168 A1    Sep. 26, 2019

(30) Foreign Application Priority Data

Mar. 20, 2018  (JP) .................................. 2018-053242

(51) Int. Cl.
*F16H 57/03*     (2012.01)
*F16H 57/021*    (2012.01)
*F16H 57/02*     (2012.01)

(52) U.S. Cl.
CPC ........... *F16H 57/03* (2013.01); *F16H 57/021* (2013.01); *F16H 2057/02052* (2013.01); *F16H 2057/02091* (2013.01)

(58) Field of Classification Search
CPC ...... F16H 57/03; F16H 57/021; F16H 57/025; F16H 57/031; F16H 57/028; F16H 2057/02052; F16H 2057/02091
See application file for complete search history.

(56) References Cited

U.S. PATENT DOCUMENTS

| 7,004,636 | B2 * | 2/2006 | Deschler | ................. F16C 35/00 |
| | | | | 384/456 |
| 8,911,312 | B2 * | 12/2014 | Itoo | ......................... F16H 57/03 |
| | | | | 474/93 |
| 9,810,309 | B2 * | 11/2017 | Chen | ...................... F16H 57/021 |
| 2015/0082940 | A1 * | 3/2015 | Tarver | .................... F16H 57/028 |
| | | | | 74/606 R |

FOREIGN PATENT DOCUMENTS

JP    2015-132358 A    7/2015

* cited by examiner

*Primary Examiner* — Patrick Cicchino
(74) *Attorney, Agent, or Firm* — Sughrue Mion, PLLC

(57) ABSTRACT

A case component of a transaxle includes: a bearing unit having a through-hole through with a shaft member is to be inserted; a matching surface unit having a matching surface on which another member is to be overlapped; bolt hole portions formed on the matching surface unit; bent wall portions, each having a V-shaped or U-shaped cross-section cut in a direction orthogonal to a straight line connecting a shaft center of the bearing unit and a shaft center of the bolt hole portions, each having a valley portion positioned on the straight line, and connecting the bearing unit and the respective bolt hole portions; and V-shaped portions, connected with the respective bent wall portions, provided on an outer circumference of the respective bolt hole portions, and protruding toward the bearing unit.

4 Claims, 17 Drawing Sheets

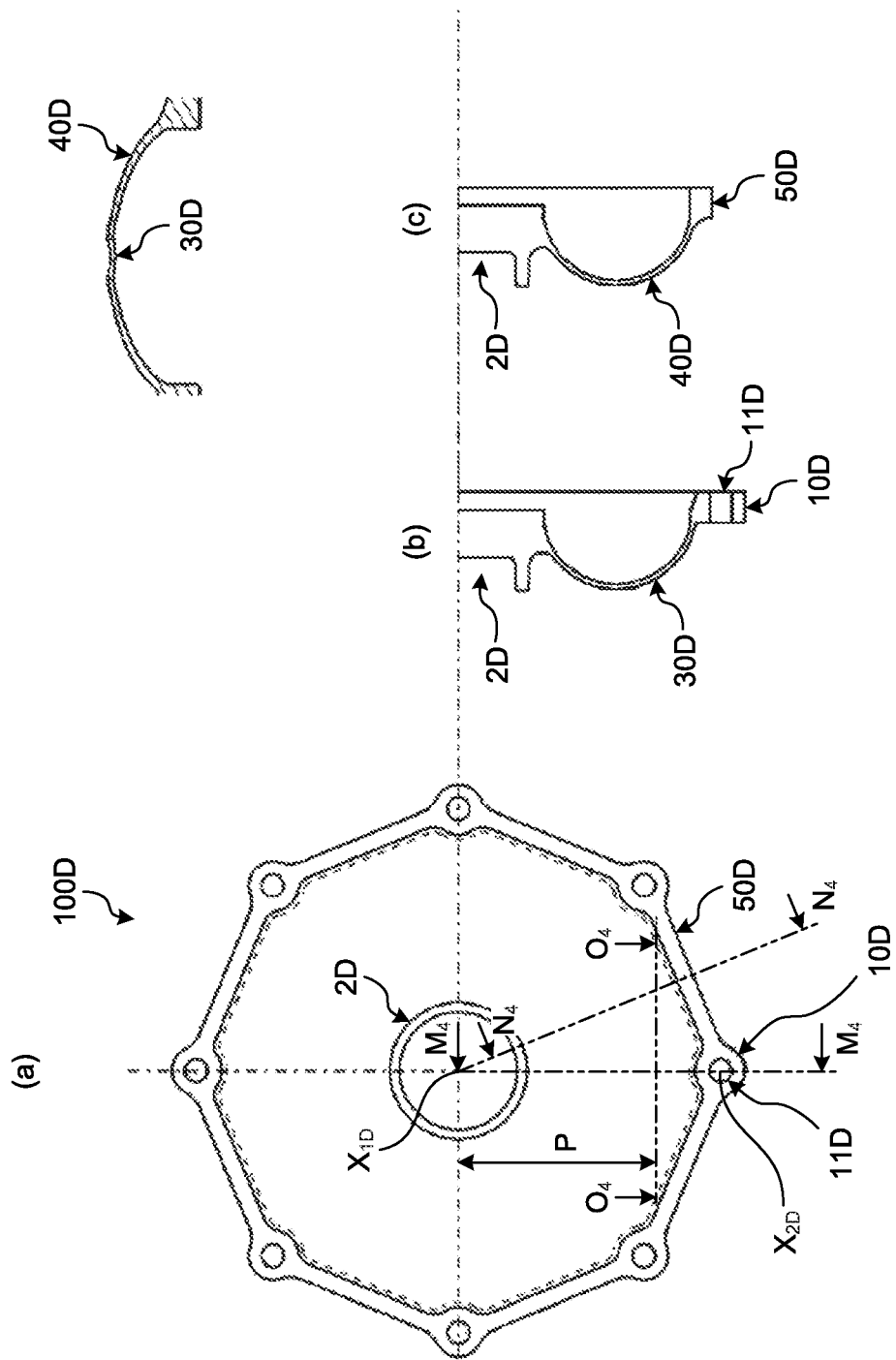

FIG.16A
FIG.16B
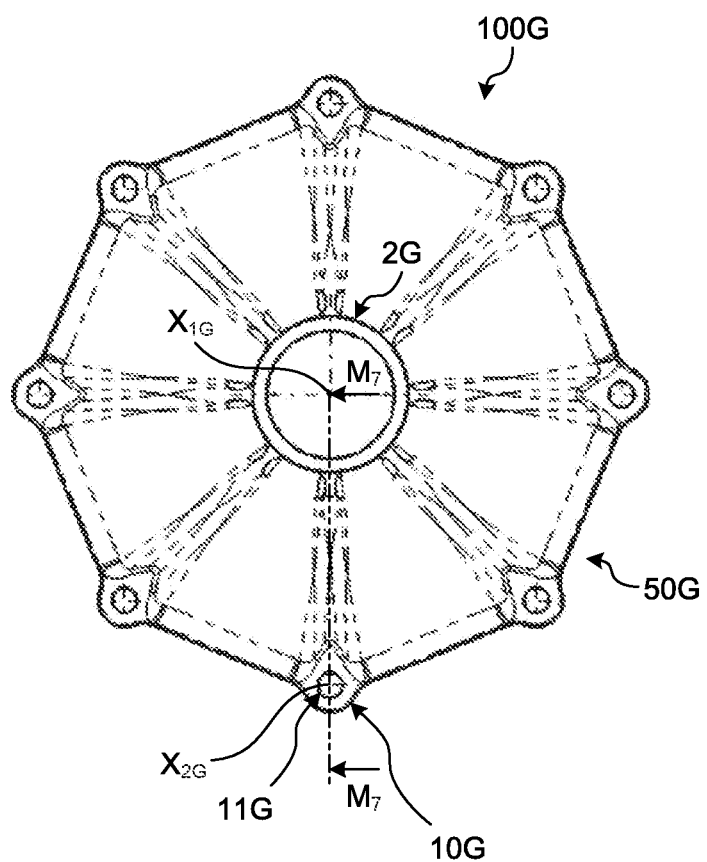
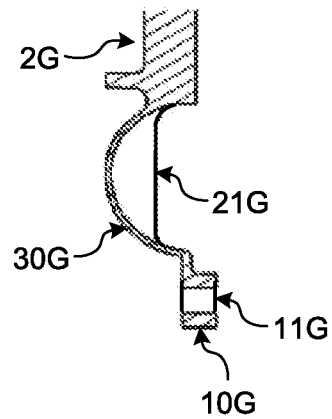

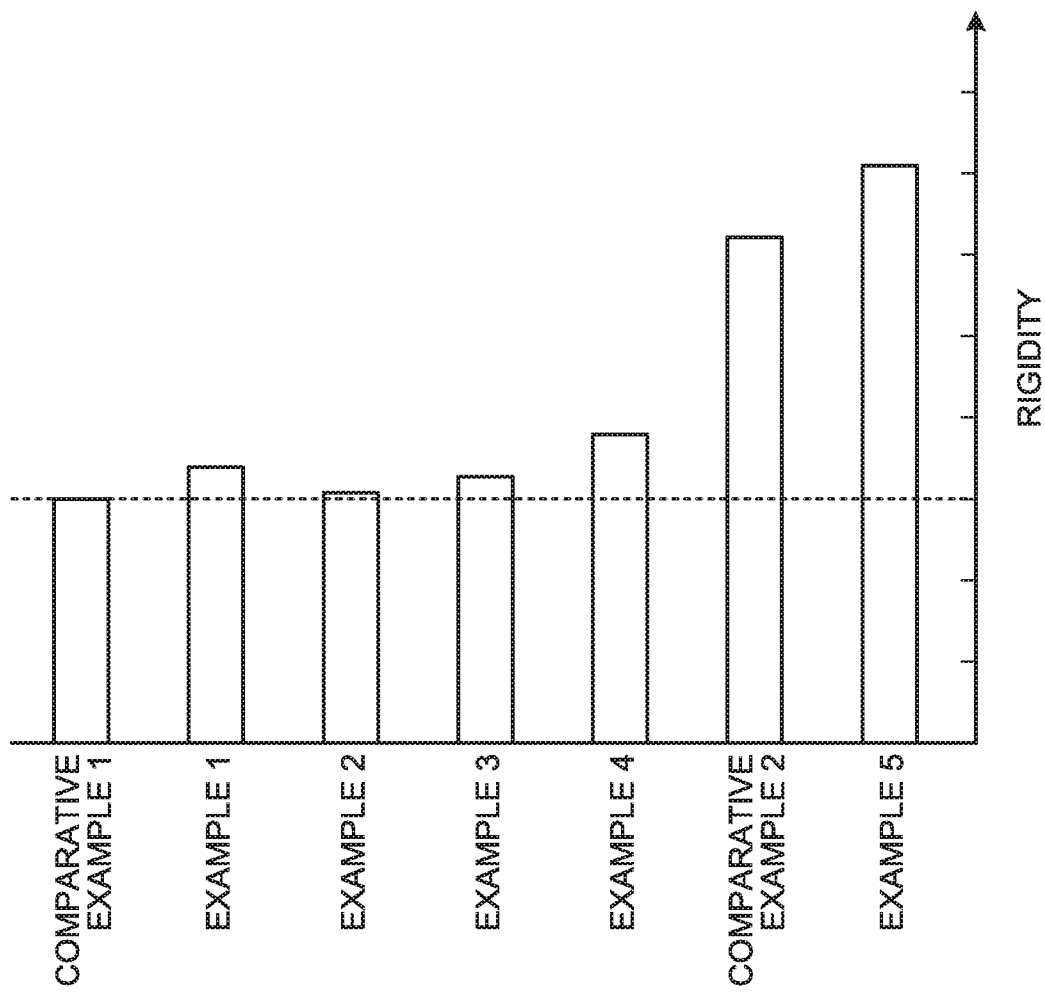

US 10,823,274 B2

CASE COMPONENT OF TRANSAXLE

CROSS-REFERENCE TO RELATED APPLICATION(S)

The present application claims priority to and incorporates by reference the entire contents of Japanese Patent Application No. 2018-053242 filed in Japan on Mar. 20, 2018.

BACKGROUND

The present disclosure relates to a case component of a transaxle.

Japanese Laid-open Patent Publication No. 2015-132358 discloses a case component of a transaxle including ribs so as to continuously extend from a first engine fastening portion of a drive device case toward a gearbox case side over a matching surface of the drive device case and a gearbox case, to continuously extend from a shaft center of a gearbox mechanism toward a drive device case side over the matching surface of the gearbox case and the drive device case through a region on a distant side, and to extend up to a second engine fastening portion of the drive device case.

Nevertheless, in a configuration in which ribs are simply provided over a wide range of a case component, a rigidity of the case component can be enhanced but may lead to a large increase in mass.

SUMMARY

There is a need for solving the problem in the related-art technology.

According to an embodiment, a case component of a transaxle includes: a bearing unit having a through-hole through with a shaft member is to be inserted; a matching surface unit having a matching surface on which another member is to be overlapped; bolt hole portions formed on the matching surface unit; bent wall portions, each having a V-shaped or U-shaped cross-section cut in a direction orthogonal to a straight line connecting a shaft center of the bearing unit and a shaft center of the bolt hole portions, each having a valley portion positioned on the straight line, and connecting the bearing unit and the respective bolt hole portions; and V-shaped portions, connected with the respective bent wall portions, provided on an outer circumference of the respective bolt hole portions, and protruding toward the bearing unit.

Figure 3A:
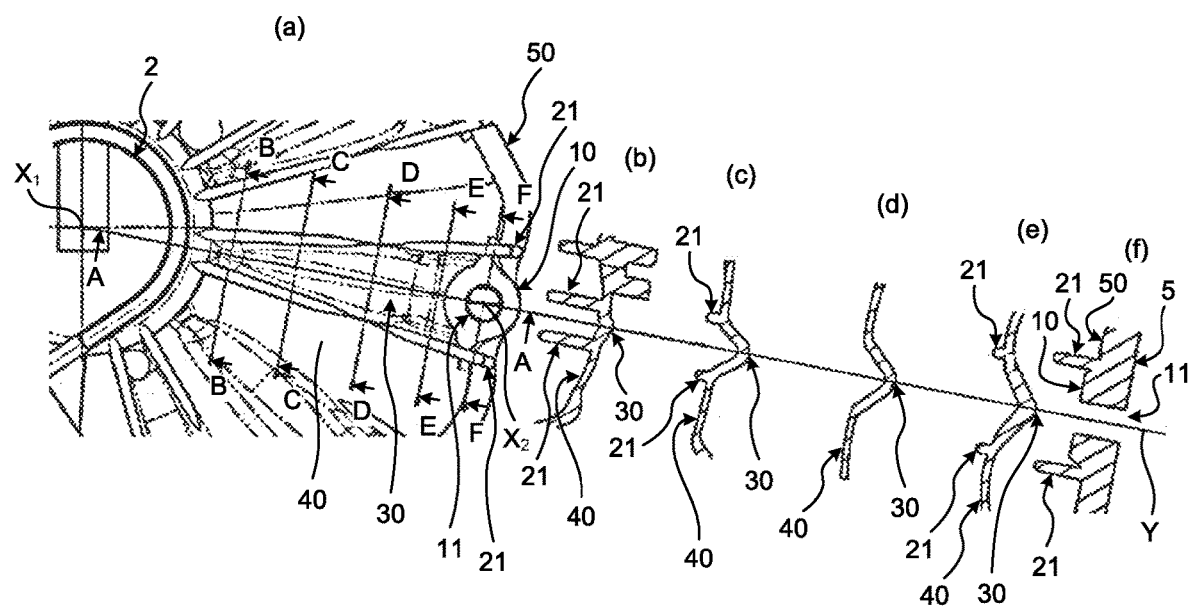
Figure 3B:
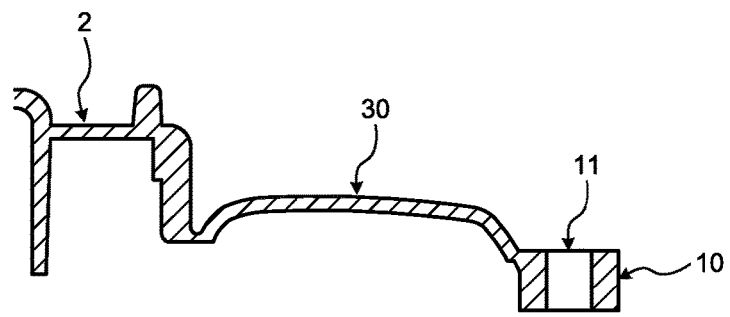
Figure 4:
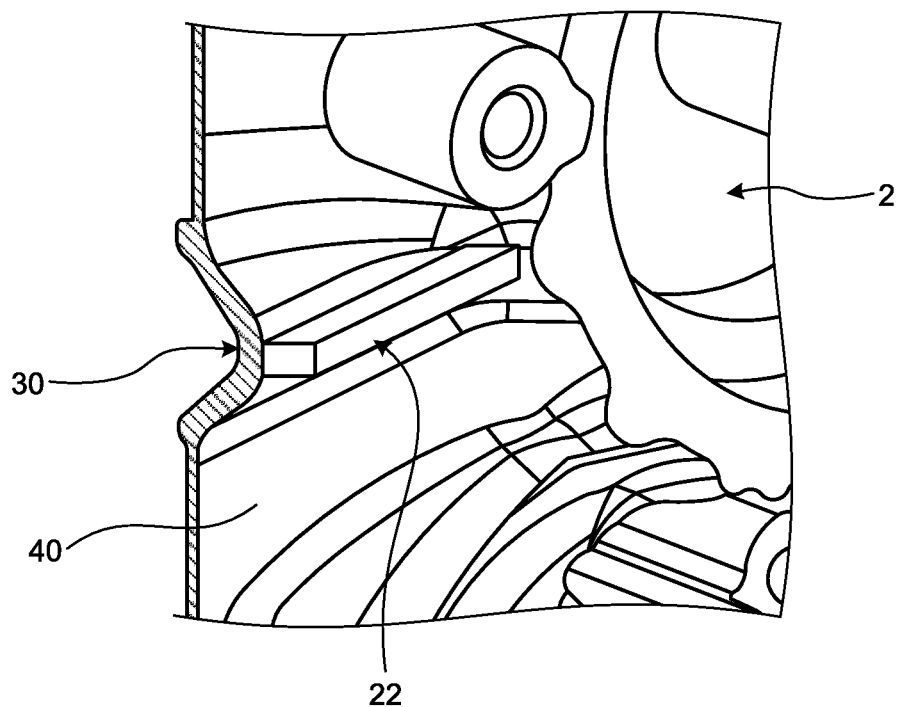
Figure 5:
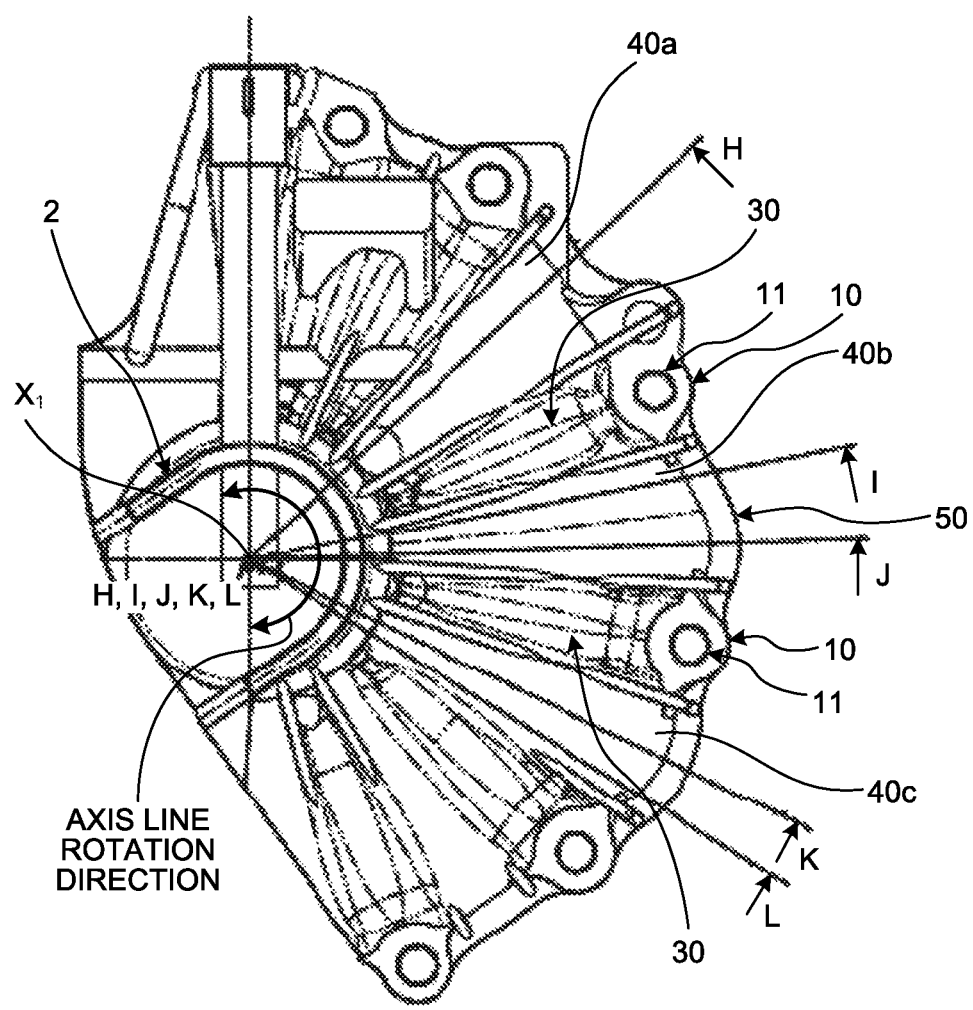
Figure 6:
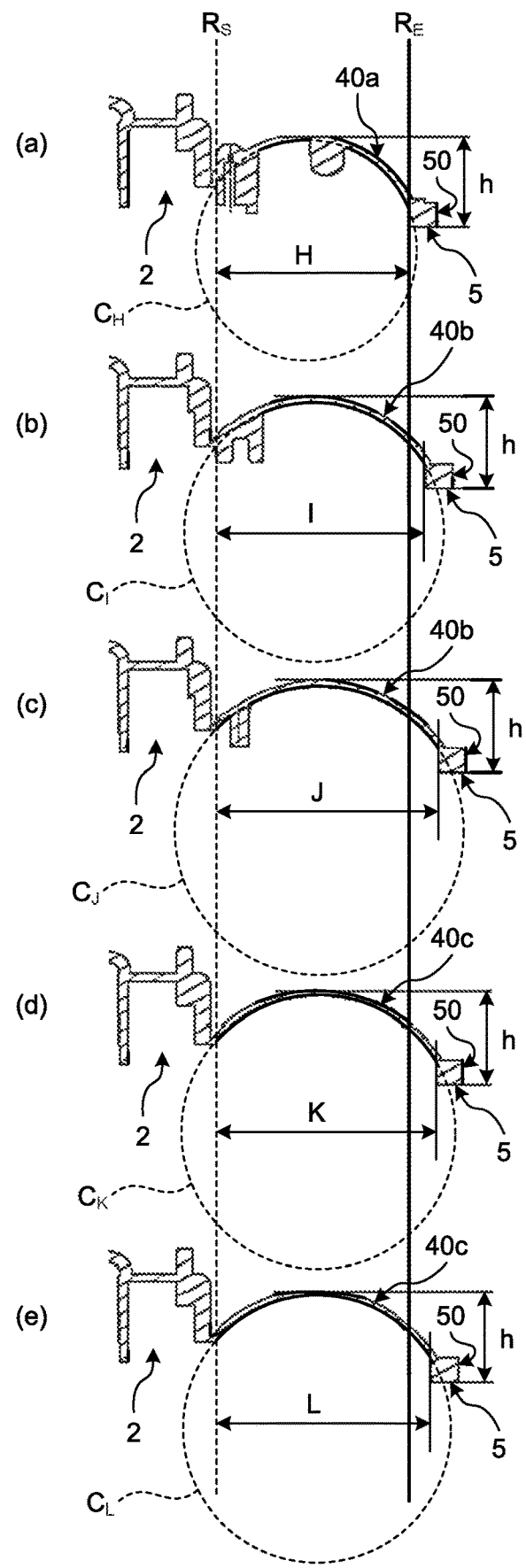
Figure 7A:
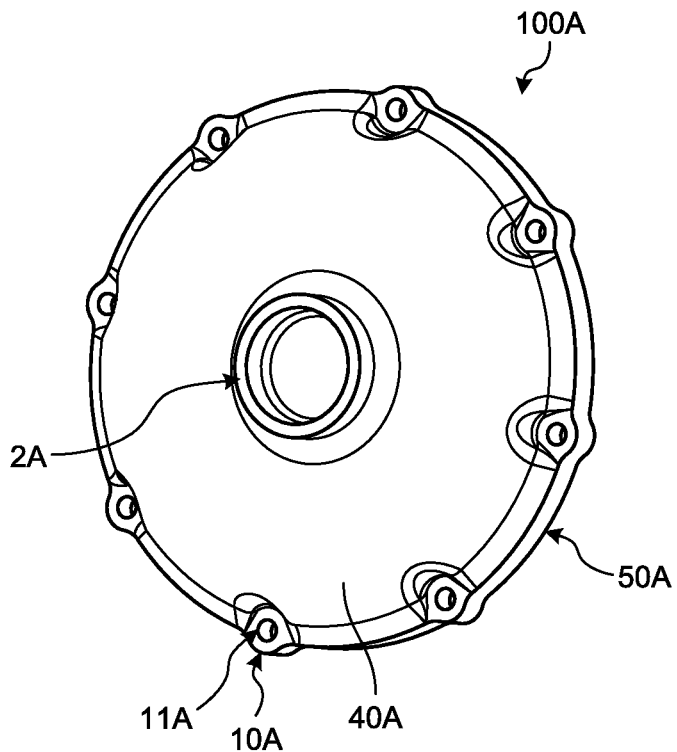
Figure 7B:
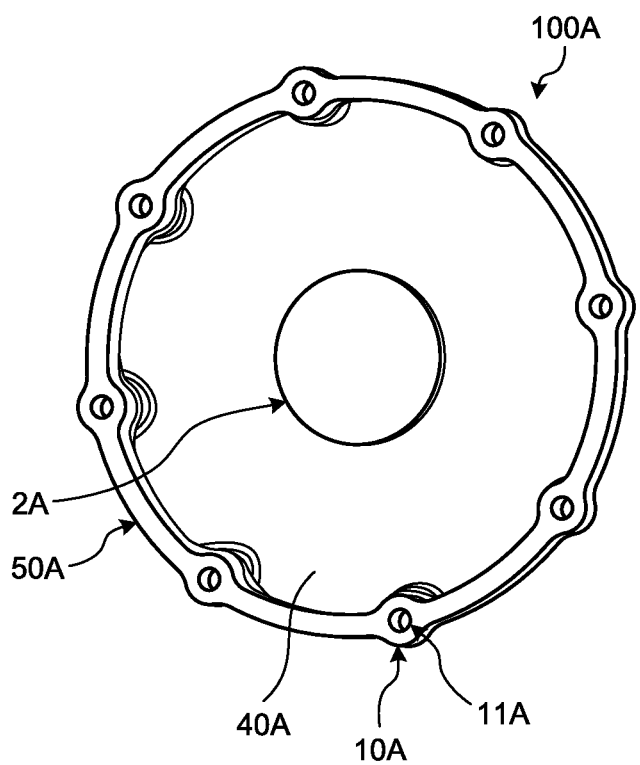
Figure 8:
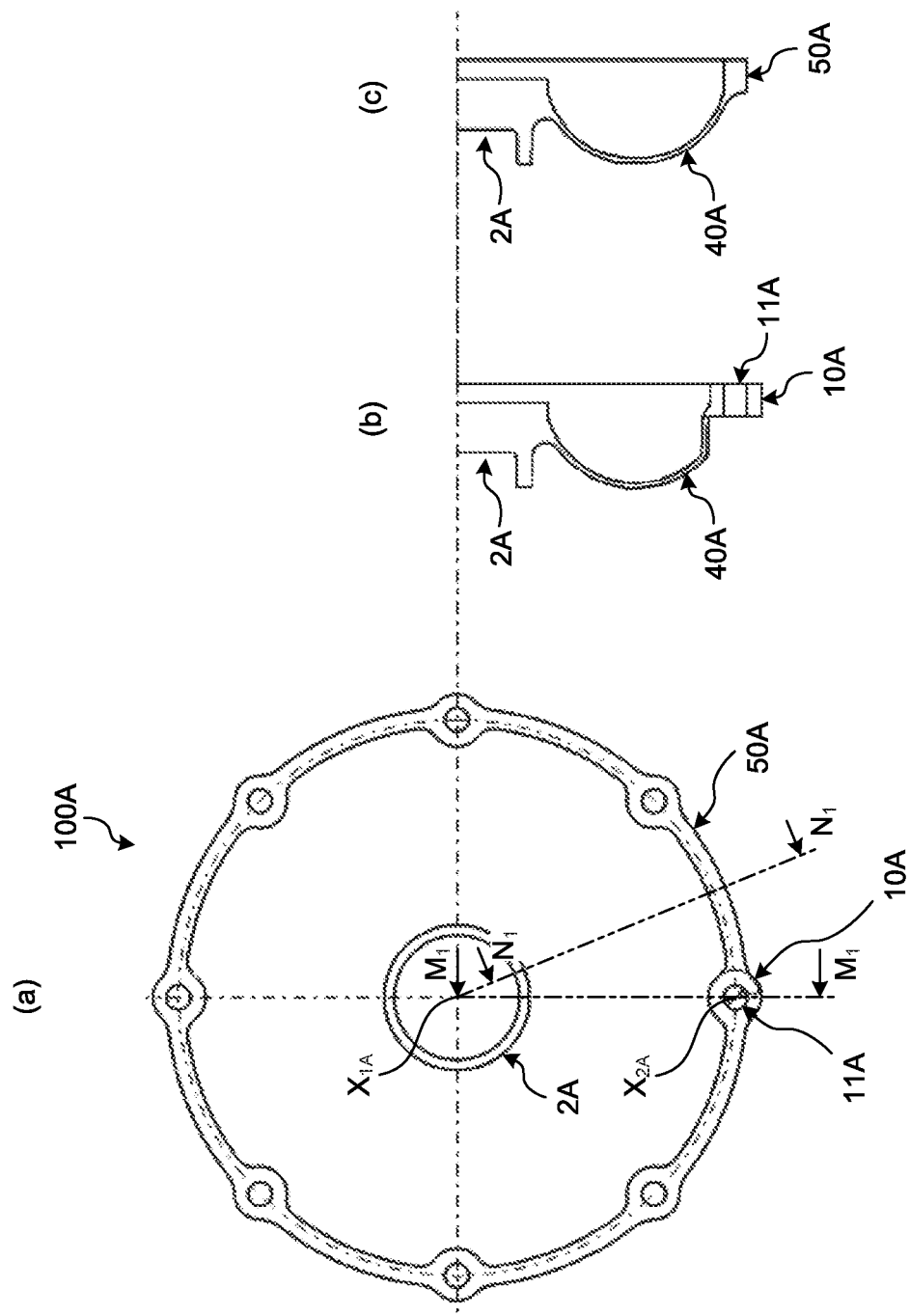
Figure 9A:
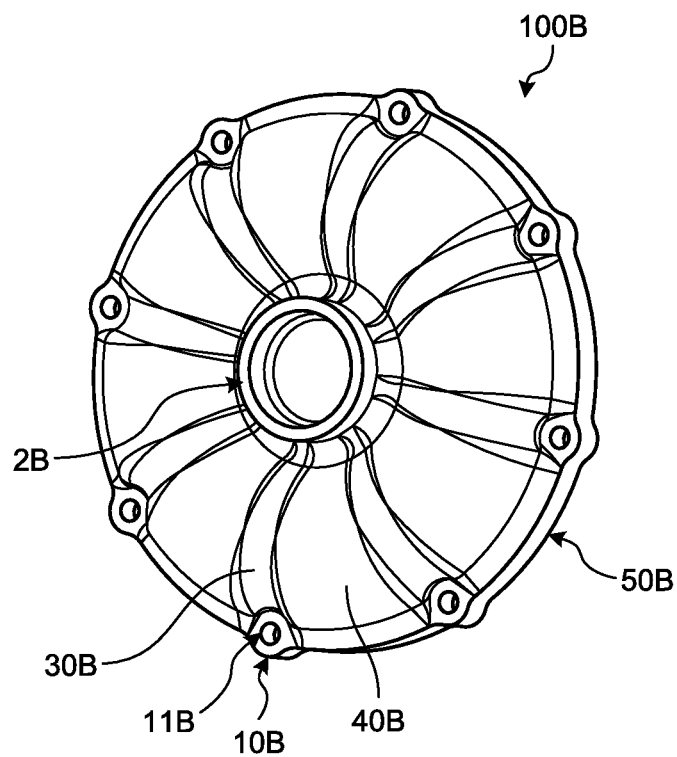
Figure 9B:
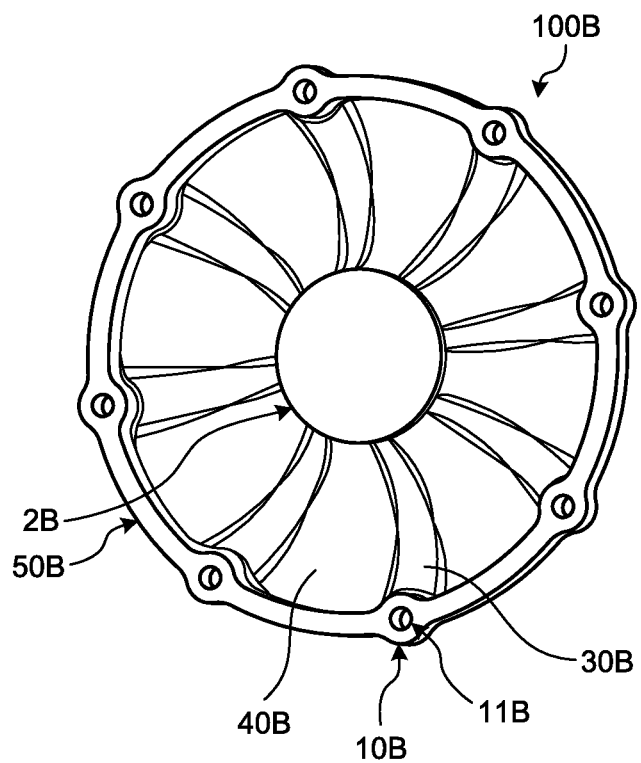
Figure 10:
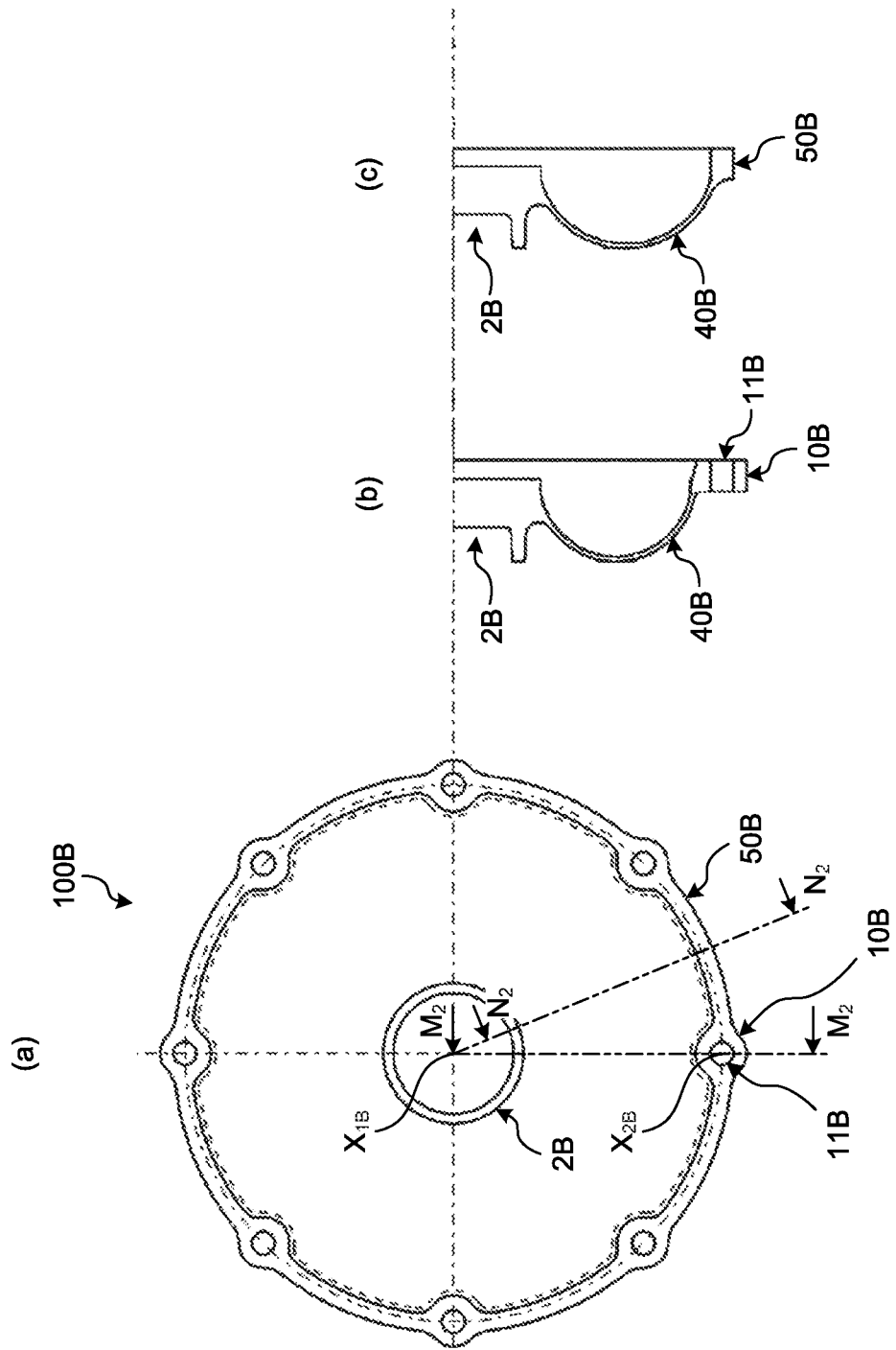
Figure 11:
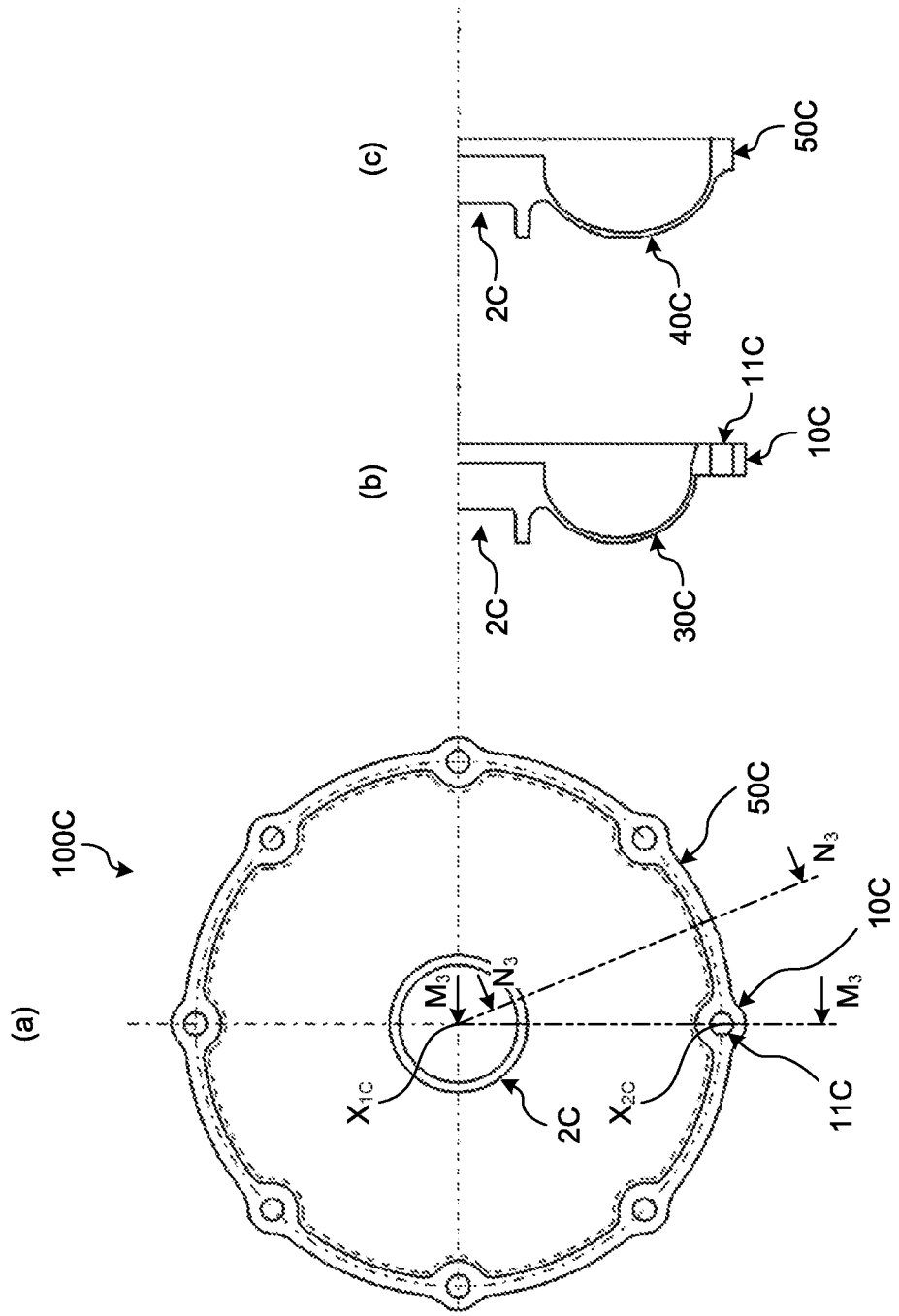
Figure 12A:
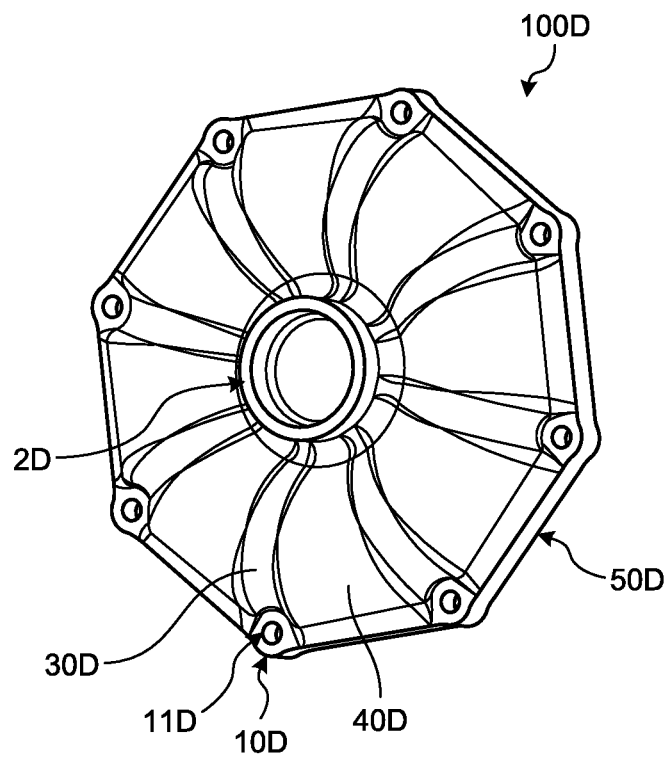
Figure 12B:
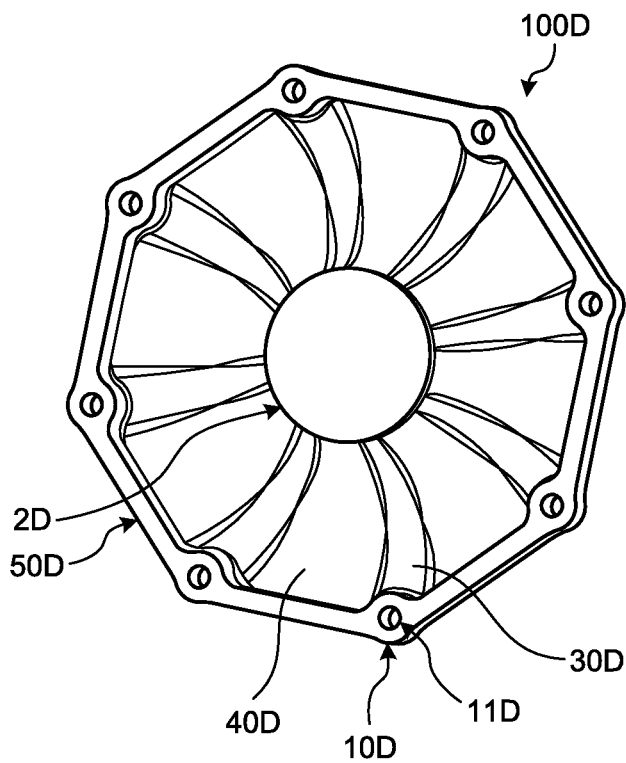
Figure 14A:
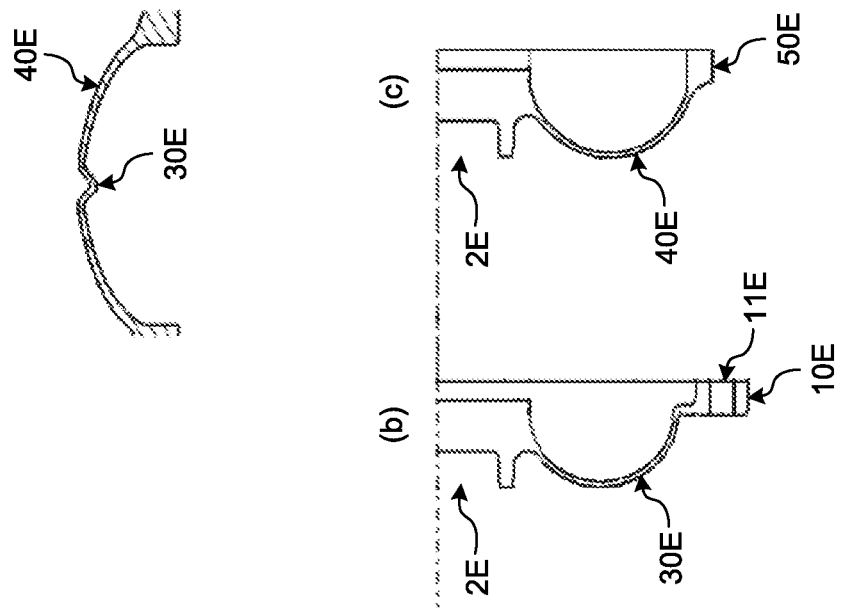
Figure 14B:
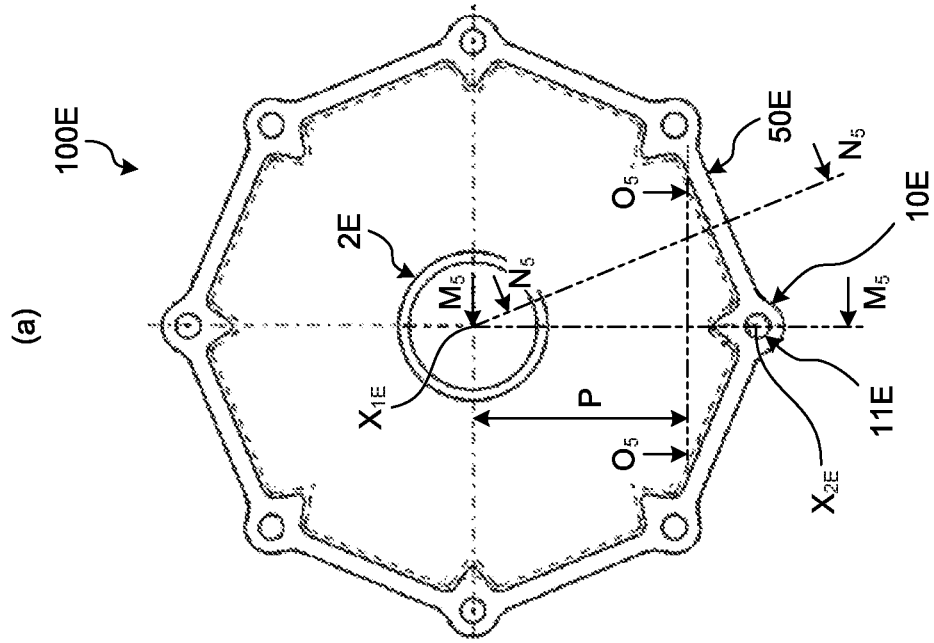
Figure 15A:
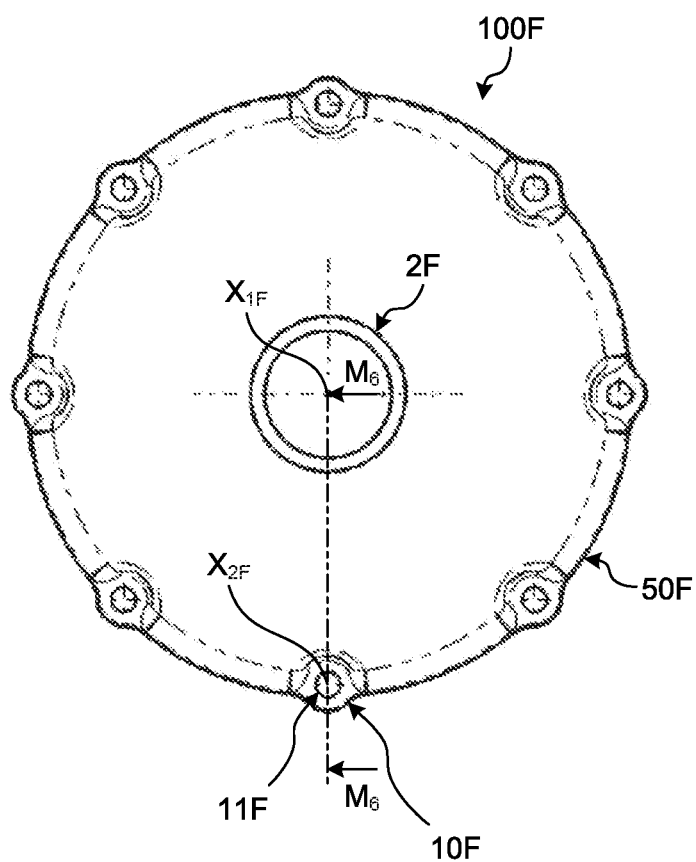
Figure 15B:
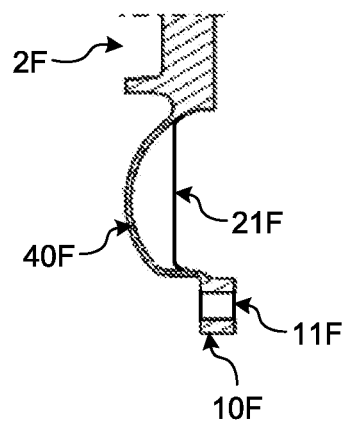

part (a) of FIG. 3A is a view illustrating a cross-sectional position of a V-shaped groove of the case component according to the embodiment;

part (b) of FIG. 3A is a B-B cross-sectional view of part (a) of FIG. 3A;

part (c) of FIG. 3A is a C-C cross-sectional view of part (a) of FIG. 3A;

part (d) of FIG. 3A is a D-D cross-sectional view of part (a) of FIG. 3A;

part (e) of FIG. 3A) is an E-E cross-sectional view of part (a) of FIG. 3A;

part (f) of FIG. 3A is an F-F cross-sectional view of part (a) of FIG. 3A;

FIG. 3B is an A-A cross-sectional view of part (a) of FIG. 3A;

FIG. 4 is a view illustrating a case where a rib is provided in a protruding portion of a V-shaped wall portion;

FIG. 5 is a view illustrating a cross-sectional cut position of a curved surface wall portion in the case component according to the embodiment;

part (a) of FIG. 6 is an H-H cross-sectional view of FIG. 5;

part (b) of FIG. 6 is an I-I cross-sectional view of FIG. 5;

part (c) of FIG. 6 is a J-J cross-sectional view of FIG. 5;

part (d) of FIG. 6 is a K-K cross-sectional view of FIG. 5;

part (e) of FIG. 6 is an L-L cross-sectional view of FIG. 5;

FIG. 7A is a perspective view of an outer side of a case component of Comparative Example 1;

FIG. 7B is a perspective view of an inner side of the case component of Comparative Example 1;

part (a) of FIG. 8 is a front view schematically illustrating the case component of Comparative Example 1;

part (b) of FIG. 8 is an $M_1$-$M_1$ cross-sectional view of part (a) of FIG. 8;

part (c) of FIG. 8 is an $N_1$-$N_1$ cross-sectional view of part (a) of FIG. 8;

FIG. 9A is a perspective view of an outer side of a case component of Example 1;

FIG. 9B is a perspective view of an inner side of the case component of Example 1;

part (a) of FIG. 10 is a front view schematically illustrating the case component of Example 1;

part (b) of FIG. 10 is an $M_2$-$M_2$ cross-sectional view of part (a) of FIG. 10;

part (c) of FIG. 10 is an $N_2$-$N_2$ cross-sectional view of part (a) of FIG. 10;

part (a) of FIG. 11 is a front view schematically illustrating a case component of Example 2;

part (b) of FIG. 11 is an $M_3$-$M_3$ cross-sectional view of part (a) of FIG. 11;

part (c) of FIG. 11 is an $N_3$-$N_3$ cross-sectional view of part (a) of FIG. 11;

FIG. 12A is a perspective view of an outer side of a case component of Example 3;

FIG. 12B is a perspective view of an inner side of the case component of Example 3;

part (a) of FIG. 13A is a front view schematically illustrating the case component of Example 3;

part (b) of FIG. 13A is an $M_4$-$M_4$ cross-sectional view of part (a) of FIG. 13A;

part (c) of FIG. 13A is an $N_4$-$N_4$ cross-sectional view of part (a) of FIG. 13A;

FIG. 13B is an $O_4$-$O_4$ cross-sectional view of part (a) of FIG. 13A;

part (a) of FIG. 14A is a front view schematically illustrating a case component of Example 4;

part (b) of FIG. 14A is an $M_5$-$M_5$ cross-sectional view of part (a) of FIG. 14A;

part (c) of FIG. 14A is an $N_5$-$N_5$ cross-sectional view of part (a) of FIG. 14A;

FIG. 14B is an $O_5$-$O_5$ cross-sectional view of part (a) of FIG. 14A;

FIG. 15A is a front view schematically illustrating a case component of Comparative Example 2;

FIG. 15B is an $M_6$-$M_6$ cross-sectional view of FIG. 15A;

FIG. 16A is a front view schematically illustrating a case component of Example 5;

FIG. 16B is an $M_7$-$M_7$ cross-sectional view of FIG. 16A; and

FIG. 17 is a graph illustrating rigidities of the respective case components of Examples 1 to 5 and Comparative Examples 1 and 2.

DETAILED DESCRIPTION

Hereinafter, an embodiment of a case component of a transaxle according to the present disclosure will be described. Note that the present disclosure is not limited to the present embodiment.

Figure 1:
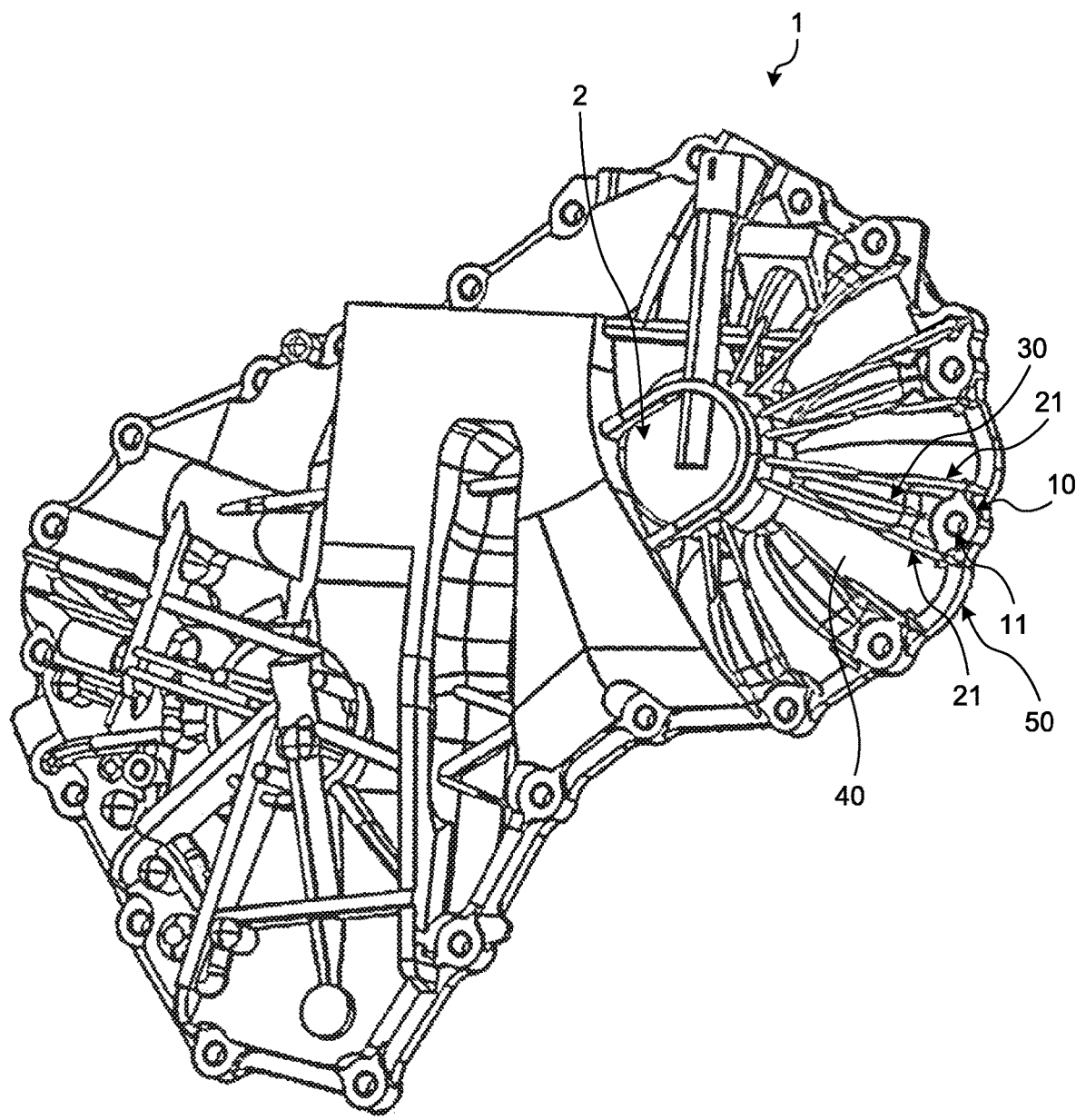
FIG. 1 is an external view of a case component of a transaxle according to an embodiment.

FIG. 1 is an external view of a case component 1 of a transaxle (hereinafter may be simplified as a "case component") 1 according to an embodiment. As illustrated in FIG. 1, the case component 1 according to the embodiment includes a bearing holding unit 2, which is a bearing unit having a through-hole through which a shaft member is inserted, a matching surface unit 50 having a matching surface 5 (refer to FIGS. 3 and 6) on which another member is overlapped thereon, and a plurality of bolt hole portions 10 provided in the matching surface unit 50. In addition, the case component 1 includes V-shaped wall portions 30 which are bent wall portions connecting the bearing holding unit 2 and the bolt hole portions 10. Each V-shaped wall portion 30 has a V-shaped cross-section cut in a direction orthogonal to a straight line Y connecting a shaft center $X_1$ of the bearing holding unit 2 and a shaft center $X_2$ of a bolt hole 11 formed in the bolt hole portions 10, and a valley portion positioned on the straight line Y. The bent wall portion may be a U-shaped wall portion having the cross-section with a U shape.

Figure 2:
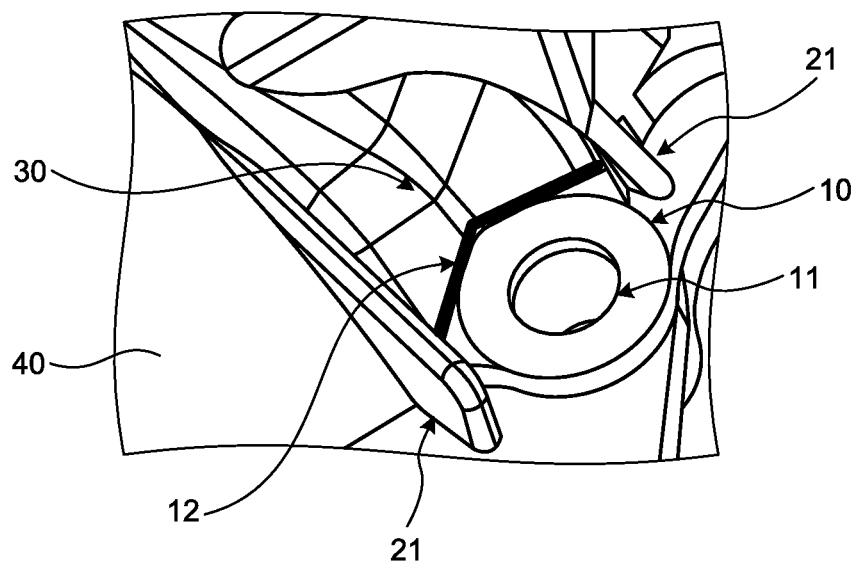
FIG. 2 is an enlarged view of the vicinity of a bolt hole portion of the case component according to the embodiment.

FIG. 2 is an enlarged view of the vicinity of the bolt hole portion 10 of the case component 1 according to the embodiment. As illustrated in FIG. 2, on the outer circumference of the bolt hole portion 10, a bolt V-shaped portion 12 protruding toward the bearing holding unit 2 is provided. The V-shaped wall portion 30 is connected to the bolt V-shaped portion 12. Because the bolt V-shaped portion 12 is a high rigidity portion, by connecting the V-shaped wall portion 30 to the bolt V-shaped portion 12, a higher rigidity can be achieved while suppressing an increase in mass of the case component 1. In addition, in this structure, by ensuring a large depth of the V shapes of the V-shaped wall portion 30 and the bolt V-shaped portion 12, further higher rigidity of the case component 1 can be achieved.

Part (a) of FIG. 3A is an enlarged view of the vicinity of the V-shaped wall portion 30 of the case component 1 according to the embodiment. Part (b) of FIG. 3A is a B-B cross-sectional view of part (a) of FIG. 3A. Part (c) of FIG. 3A is a C-C cross-sectional view of part (a) of FIG. 3A. Part (d) of FIG. 3A is a D-D cross-sectional view of part (a) of FIG. 3A. Part (e) of FIG. 3A is an E-E cross-sectional view of part (a) of FIG. 3A. Part (f) of FIG. 3A is an F-F cross-sectional view of part (a) of FIG. 3A. FIG. 3B is an A-A cross-sectional view of part (a) of FIG. 3A.

As illustrated in FIGS. 3A and 3B, the case component 1 according to the embodiment includes a pair of ribs 21 extending along the rims on both sides of the V-shaped wall portion 30. In this manner, by providing the ribs 21 along the rims of the V-shaped wall portion 30, a rigidity useful for a vibration mode with a second order or more can be ensured and a contribution to NV performance can be obtained.

Here, in the case component 1 according to the embodiment, as seen from parts (a) and (d) of FIG. 3A, the ribs 21 are not provided in a rim portion corresponding to the D-D cross-section of the V-shaped wall portion 30, and the ribs 21 are provided with intermittently extending on the rim of the V-shaped wall portion 30 from the bearing holding unit 2 side toward the bolt hole portion 10 side. In this manner, even if the ribs 21 are provided with intermittently extending, a higher rigidity can be achieved as compared with a case where no rib 21 is provided on the rim of the V-shaped wall portion 30. In addition, in the case component 1 according to the embodiment, the ribs 21 may be provided with continuously extending over the entire region of the rim of the V-shaped wall portion 30 from the bearing holding unit 2 side toward the bolt hole portion 10 side.

In addition, in the case component 1 according to the embodiment, as illustrated in FIG. 4, a rib 22 extending from the shaft center side of the bearing holding unit 2 toward the shaft center side of the bolt hole portion 10 may be provided in the protruding portion of the V-shaped wall portion 30. In this manner, by providing the rib 22 in the protruding portion of the V-shaped wall portion 30, it becomes possible to enhance rigidity while suppressing the height of the rib 22 as compared with a case where the rib 22 is provided in a curved surface wall portion 40.

FIG. 5 is a view illustrating a cross-sectional cut positions of the curved surface wall portion 40 in the case component 1 according to the embodiment. In the case component 1 according to the embodiment, as illustrated in FIG. 5, the curved surface wall portion 40, formed into a curved surface shape constituting a general surface from the bearing holding unit 2 to the matching surface unit 50, is provided between the V-shaped wall portions 30 adjacent in an axis line rotation direction of the bearing holding unit 2. In addition, the cross-section of the curved surface wall portion 40 on a plane passing through a straight line extending from the shaft center $X_1$ of the bearing holding unit 2 toward the matching surface unit 50, and an axis line of the bearing holding unit 2 has an arc shape of a true circle at any position of the curved surface wall portion 40 in the axis line rotation direction.

Part (a) of FIG. 6 is an H-H cross-sectional view of FIG. 5. Part (b) of FIG. 6 is an I-I cross-sectional view of FIG. 5. Part (c) of FIG. 6 is a J-J cross-sectional view of FIG. 5. Part (d) of FIG. 6 is a K-K cross-sectional view of FIG. 5. Part (e) of FIG. 6 is an L-L cross-sectional view of FIG. 5.

Here, as illustrated in FIG. 5 as an example, attention will be paid to five cross-sectional positions in the axis line rotation direction of the bearing holding unit 2 of three curved surface wall portions 40a, 40b, and 40c in the case component 1. As illustrated in parts (a) to (e) of FIGS. 6, heights h from the matching surface 5 to top portions of the curved surface wall portions 40a, 40b, and 40c are the same at any cross-sectional position.

Next, as illustrated in part (a) of FIG. 6, the H-H cross-section of the curved surface wall portion 40a has an arc shape of a true circle $C_H$. In addition, as illustrated in part (b) of FIG. 6, the I-I cross-section of the curved surface wall portion 40b has an arc shape of a true circle $C_I$. In addition, similarly, as illustrated in part (c) of FIG. 6, the J-J cross-section of the curved surface wall portion 40b has an arc shape of a true circle $C_J$. In addition, as illustrated in part (d) of FIG. 6, the K-K cross-section of the curved surface wall portion 40c has an arc shape of a true circle $C_K$. In addition, similarly, as illustrated in part (e) of FIG. 6, the L-L cross-section of the curved surface wall portion 40c has an arc shape of a true circle $C_L$. In addition, a magnitude relation between the respective radii of the true circles $C_H$ to $C_L$ is described as $C_H < C_I < C_J < C_K < C_L$.

Here, as illustrated in parts (a) to (e) of FIG. 6, curve start positions $R_S$ in the curved surface wall portions 40a, 40b, and 40c are the same at any cross-sectional position. On the other hand, direct distances H to L from the curve start positions $R_S$ to curve end positions $R_E$ vary depending on the cross-sectional positions. Thus, in the case component 1 according to the embodiment, by varying the radii of the true circles $C_H$ to $C_L$, the cross-sectional shapes of the curved surface wall portions 40a, 40b, and 40c are kept in arc shapes of true circles at any cross-sectional position. In this manner, by forming the curved surface wall portion 40 so as to have an arc shape of a true circle at any cross-sectional position, a higher rigidity can be achieved as compared with a case where a cross-section of the curved surface wall portion 40 has an arc shape obtained by combining circles with different radii, such as an ellipsoidal arc shape.

Next, effectiveness of the V-shaped wall portion 30 connecting the bearing holding unit 2 and the bolt hole portions 10, the ribs 21 provided on the rims of the V-shaped wall portion 30, and the curved surface wall portion 40 having a cross-section with an arc shape of a true circle will be described while comparing respective case components 100A to 100G representing Examples 1 to 5 and Comparative Examples 1 and 2.

Table 1 described below summarizes and lists shapes and properties of the respective case components 100A to 100G of Example 1 to 5 and Comparative Examples 1 and 2.

TABLE 1

|  | Mass Difference From Comparative Example 1 [g] | First-Order Mode Eigen Value [Hz] | Shape Between Bolt Hole Portions Of Matching Surface Unit | General Surface Cross-Sectional Shape | Groove Depth | Rib |
| --- | --- | --- | --- | --- | --- | --- |
| Comparative Example 1 | — | 594 | Arc | True Circle | Absent | Absent |
| Example 1 | +20 | 671 | Arc | True Circle | Present | Absent |
| Example 2 | +40 | 614 | Arc | Ellipse | Present (Same As Example 1) | Absent |
| Example 3 | −10 | 647 | Linear | True Circle | Present (Same As Example 1) | Absent |
| Example 4 | −10 | 761 | Linear | True Circle | Present (Deeper Than Example 3) | Absent |
| Comparative Example 2 | +116 | 1237 | Arc | True Circle | Absent | Present |
| Example 5 | +87 | 1412 | Linear | True Circle | Present (Same As Example 4) | Present |

FIG. 7A is a perspective view of an outer side of the case component 100A of Comparative Example 1. FIG. 7B is a perspective view of an inner side of the case component 100A of Comparative Example 1. Part (a) of FIG. 8 is a front view schematically illustrating the case component 100A of Comparative Example 1. Part (b) of FIG. 8 is an $M_1$-$M_1$ cross-sectional view of part (a) of FIG. 8. Part (c) of FIG. 8 is an $N_1$-$N_1$ cross-sectional view of part (a) of FIG. 8. In addition, the $M_1$-$M_1$ cross-section is a cut surface cut on a straight line passing through a shaft center $X_{1A}$ of a bearing unit 2A and a shaft center $X_{2A}$ of a bolt hole 11A formed in bolt hole portions 10A. In addition, the $N_1$-$N_1$ cross-section is a cut surface cut on a straight line passing through the shaft center $X_{1A}$ of the bearing unit 2A and a matching surface unit 50A.

The case component 100A of Comparative Example 1 is not provided with the V-shaped wall portion 30, and the cross-sectional shape of a curved surface wall portion 40A has an arc shape of a true circle. In addition, in the case component 100A of Comparative Example 1, a shape between the bolt hole portions of the matching surface unit 50A has an arc shape. In addition, a first-order mode eigen value of the case component 100A of Comparative Example 1 is 594 Hz. In addition, the case component 100A of Comparative Example 1 is not provided with the ribs 21.

FIG. 9A is a perspective view of an outer side of the case component 100B of Example 1. FIG. 9B is a perspective view of an inner side of the case component 100B of Example 1. Part (a) of FIG. 10 is a front view schematically illustrating the case component 100B of Example 1. Part (b) of FIG. 10 is an $M_2$-$M_2$ cross-sectional view of part (a) of FIG. 10. Part (c) of FIG. 10 is an $N_2$-$N_2$ cross-sectional view of part (a) of FIG. 10. In addition, the $M_2$-$M_2$ cross-section is a cut surface cut on a straight line passing through a shaft center $X_{1B}$ of a bearing unit 2B and a shaft center $X_{2B}$ of a bolt hole 11B formed in bolt hole portions 10B. In addition, the $N_2$-$N_2$ cross-section is a cut surface cut on a straight line passing through the shaft center $X_{1B}$ of the bearing unit 2B and a matching surface unit 50B.

The case component 100B of Example 1 is provided with a V-shaped wall portion 30B, and the cross-sectional shape of a curved surface wall portion 40B has an arc shape of a true circle. In addition, in the case component 100B of Example 1, a shape between the bolt hole portions of the matching surface unit 50B has an arc shape. In addition, in the case component 100B of Example 1, the ribs 21 are not provided on the rims of the V-shaped wall portion 30B. The mass of the case component 100B of Example 1 differs from the mass of the case component 100A of Comparative Example 1 by +20 g. In addition, a first-order mode eigen value of the case component 100B of Example 1 is 671 Hz.

Part (a) of FIG. 11 is a front view schematically illustrating the case component 100C of Example 2. Part (b) of FIG. 11 is an $M_3$-$M_3$ cross-sectional view of part (a) of FIG. 11. Part (c) of FIG. 11 is an $N_3$-$N_3$ cross-sectional view of part (a) of FIG. 11. In addition, the $M_3$-$M_3$ cross-section is a cut surface cut on a straight line passing through a shaft center $X_{1C}$ of a bearing unit 2C and a shaft center $X_{2C}$ of a bolt hole 11C formed in bolt hole portions 10C In addition, the $N_3$-$N_3$ cross-section is a cut surface cut on a straight line passing through the shaft center $X_{1C}$ of the bearing unit 2C and a matching surface unit 50C.

The case component 100C of Example 2 is provided with a V-shaped wall portion 30C, and the cross-sectional shape of a curved surface wall portion 40C has an ellipsoidal arc shape. The depth of the V-shaped wall portion 30C is the same as the depth of the V-shaped wall portion 30B provided in the case component 100B of Example 1. In addition, in the case component 100C of Example 2, a shape between the bolt hole portions of the matching surface unit 50C has an arc shape. In addition, in the case component 100C of Example 2, the ribs 21 are not provided on the rims of the V-shaped wall portion 30C. The mass of the case component 100C of Example 2 differs from the mass of the case component 100A of Comparative Example 1 by +40 g. In addition, a first-order mode eigen value of the case component 100C of Example 2 is 614 Hz.

FIG. 12A is a perspective view of an outer side of the case component 100D of Example 3. FIG. 12B is a perspective view of an inner side of the case component 100D of Example 3. Part (a) of FIG. 13A is a front view schematically illustrating the case component 100D of Example 3. Part (b) of FIG. 13A is an $M_4$-$M_4$ cross-sectional view of part (a) of FIG. 13A. Part (c) of FIG. 13A is an $N_4$-$N_4$ cross-sectional view of part (a) of FIG. 13A. FIG. 13B is an $O_4$-$O_4$ cross-sectional view of part (a) of FIG. 13A. In addition, the $M_4$-$M_4$ cross-section is a cut surface cut on a straight line passing through a shaft center $X_{1D}$ of a bearing unit 2D and a shaft center $X_{2D}$ of a bolt hole 11D formed in bolt hole portions 10D. In addition, the $N_4$-$N_4$ cross-section is a cut surface cut on a straight line passing through the shaft center $X_{1D}$ of the bearing unit 2D and a matching surface unit 50D. In addition, the $O_4$-$O_4$ cross-section is a cut surface at a position distant by a distance P from the shaft center $X_{1D}$ toward the shaft center $X_{2D}$.

The case component 100D of Example 3 is provided with a V-shaped wall portion 30D, and the cross-sectional shape of a curved surface wall portion 40D has an arc shape of a true circle. The depth of the V-shaped wall portion 30D is the same as the depth of the V-shaped wall portion 30B provided in the case component 100B of Example 1. In addition, in the case component 100D of Example 3, a shape between the bolt hole portions of the matching surface unit 50D has a linear shape. In addition, in the case component 100D of Example 3, the ribs 21 are not provided on the rims of the V-shaped wall portion 30D. The mass of the case component 100D of Example 3 differs from the mass of the case component 100A of Comparative Example 1 by +10 g. In addition, a first-order mode eigen value of the case component 100D of Example 3 is 647 Hz.

Part (a) of FIG. 14 is a front view schematically illustrating the case component 100E of Example 4. Part (b) of FIG. 14 is an $M_5$-$M_5$ cross-sectional view of part (a) of FIG. 14A. Part (c) of FIG. 14A is an $N_5$-$N_5$ cross-sectional view of part (a) of FIG. 14A. FIG. 14B is an $O_5$-$O_5$ cross-sectional view of part (a) of FIG. 14A. In addition, the $M_5$-$M_5$ cross-section is a cut surface cut on a straight line passing through a shaft center $X_{1E}$ of a bearing unit 2E and a shaft center $X_{2E}$ of a bolt hole 11E formed in bolt hole portions 10E. In addition, the $N_5$-$N_5$ cross-section is a cut surface cut on a straight line passing through the shaft center $X_{1E}$ of the bearing unit 2E and a matching surface unit 50E. In addition, the $O_5$-$O_5$ cross-section is a cut surface at a position separated by the distance P from the shaft center $X_{1E}$ toward the shaft center $X_{2E}$.

The case component 100E of Example 4 is provided with a V-shaped wall portion 30E, and the cross-sectional shape of a curved surface wall portion 40E has an arc shape of a true circle. The depth of the V-shaped wall portion 30E is deeper than the depth of the V-shaped wall portion 30D provided in the case component 100D of Example 3. In addition, in the case component 100E of Example 4, a shape between the bolt hole portions of the matching surface unit 50E has a linear shape. In addition, in the case component 100E of Example 4, the ribs 21 are not provided on the rims of the V-shaped wall portion 30E. The mass of the case component 100E of Example 4 differs from the mass of the case component 100A of Comparative Example 1 by +10 g. In addition, a first-order mode eigen value of the case component 100E of Example 4 is 761 Hz.

FIG. 15A is a front view schematically illustrating the case component 100F of Comparative Example 2. FIG. 15B is an $M_6$-$M_6$ cross-sectional view of FIG. 15A; In addition, the $M_6$-$M_6$ cross-section is a cut surface cut on a straight line passing through a shaft center $X_{1F}$ of a bearing unit 2F and a shaft center $X_{2F}$ of a bolt hole 11F formed in bolt hole portions 10F.

The case component 100F of Comparative Example 2 is not provided with the V-shaped wall portion 30, the cross-sectional shape of a curved surface wall portion 40F has an arc shape of a true circle, and a plurality of ribs 21F are provided in the curved surface wall portion 40F. In addition, in the case component 100F of Comparative Example 2, a shape between the bolt hole portions of the matching surface unit 50F has an arc shape. The mass of the case component 100F of Comparative Example 2 differs from the mass of the case component 100A of Comparative Example 1 by +116 g. In addition, a first-order mode eigen value of the case component 100F of Comparative Example 2 is 1237 Hz.

FIG. 16A is a front view schematically illustrating the case component 100G of Example 5. FIG. 16B is an $M_7$-$M_7$ cross-sectional view of FIG. 16A. In addition, the $M_7$-$M_7$ cross-section is a cut surface cut on a straight line passing through a shaft center $X_{1G}$ of a bearing unit 2G and a shaft center $X_{2G}$ of a bolt hole 11G formed in bolt hole portions 10G.

The case component 100G of Example 5 is provided with a V-shaped wall portion 30G, the cross-sectional shape of a curved surface wall portion 40G has an arc shape of a true circle, and a plurality of ribs 21G are provided on the rims of the V-shaped wall portion 30G. The depth of the V-shaped wall portion 30G is the same as the depth of the V-shaped wall portion 30E provided in the case component 100E of Example 4. In addition, in the case component 100G of Example 5, a shape between the bolt hole portions of the matching surface unit 50G has a linear shape. The mass of the case component 100G of Example 5 differs from the mass of the case component 100A of Comparative Example 1 by +87 g. In addition, a first-order mode eigen value of the case component 100G of Example 5 is 1412 Hz.

FIG. 17 is a graph illustrating rigidities of the respective case components 100A to 100G corresponding to Examples 1 to 5 and Comparative Examples 1 and 2.

When the case component 100A of Comparative Example 1 and the case component 100B of Example 1, which have substantially the same shape except the presence or absence of the V-shaped wall portion 30, are compared, as seen from FIG. 17, the case component 100B of Example 1 that is provided with the V-shaped wall portion 30B has a higher rigidity than that of the case component 100A of Comparative Example 1 that is not provided with the V-shaped wall portion 30. Thus, it can be seen that the V-shaped wall portion 30B contributes to the higher rigidity of the case component 100B of Example 1.

Next, when the case component 100D of Example 3 and the case component 100E of Example 4, which have substantially the same shape except the depth of the V-shaped wall portion 30, are compared, as illustrated in FIG. 17, the case component 100E of Example 4 that has a deeper depth of the V-shaped wall portion 30E has a higher rigidity than that of the case component 100D of Example 3. Thus, it can be seen that the depth of the V-shaped wall portion 30E contributes to the higher rigidity of the case component 100E of Example 4.

Next, when the case component 100B of Example 1 and the case component 100C of Example 2, which have substantially the same shape except the cross-sectional shape of the curved surface wall portion 40, are compared, as seen from FIG. 17, the case component 100B of Example 1 that includes the curved surface wall portion 40B having a cross-sectional shape being an arc shape of a true circle has a higher rigidity than that of the case component 100C of Example 2 that includes the curved surface wall portion 40C having an ellipsoidal arc-shaped cross-sectional shape. Thus, it can be seen that the cross-sectional shape of the curved surface wall portion 40B, which is an arc shape of a true circle, contributes to the higher rigidity of the case component 100B of Example 1.

In addition, as illustrated in Table 1, when Examples 1 to 4 and Comparative Example 1, which are provided with no ribs 21, are compared, as seen from FIG. 17, the rigidities of all of the case components 100B to 100E of Examples 1 to 4 are higher than that of the case component 100A of Comparative Example 1.

Next, as illustrated in Table 1, the case component 100F of Comparative Example 2 and the case component 100G of Example 5, which are provided with the ribs 21, are compared, as seen from FIG. 17, the case component 100G of Example 5 in which ribs 21G are provided on the rims of the V-shaped wall portion 30G has a higher rigidity than that of the case component 100F of Comparative Example 2 in which ribs 21F are provided in the curved surface wall portion 40F. In addition, according to Table 1, the case component 100G of Example 5 is lighter than the case component 100F of Comparative Example 2. Thus, it can be seen that by providing the V-shaped wall portion 30, and providing the ribs 21 on the rims of the V-shaped wall portion 30, a high rigidity can be achieved while suppressing an increase in mass.

According to an embodiment, a higher rigidity can be achieved as compared with a case where the cross-section of the curved surface wall portion has an arc shape obtained by combining circles with different radii.

According to an embodiment, a rigidity useful for a vibration mode with a second order or more can be ensured and a contribution to NV performance can be made.

According to an embodiment, it becomes possible to enhance rigidity while suppressing the height of the rib.

The case component of a transaxle according to the present disclosure can cause such an effect that high rigidity can be ensured while suppressing an increase in mass.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A case component of a transaxle comprising:
   a bearing unit having a through-hole through with a shaft member is to be inserted;
   a matching surface unit having a matching surface on which another member is to be overlapped;
   bolt hole portions formed on the matching surface unit;
   bent wall portions, each having a V-shaped or U-shaped cross-section cut in a direction orthogonal to a straight line connecting a shaft center of the bearing unit and a shaft center of the bolt hole portions, each having a valley portion positioned on the straight line, and connecting the bearing unit and the respective bolt hole portions; and
   V-shaped portions, connected with the respective bent wall portions, provided on an outer circumference of the respective bolt hole portions, and protruding toward the bearing unit.

2. The case component of a transaxle according to claim 1, further comprising:
   curved surface wall portions provided between the adjacent bent wall portions, and formed into a curved surface shape constituting a general surface from the bearing unit to the matching surface unit,
   wherein cross-sections of the curved surface wall portions on planes including respective straight lines extending from the shaft center of the bearing unit toward the matching surface unit and an axis line of the bearing unit have an arc shape of a true circle at any position of the curved surface wall portions in directions orthogonal to the direction of the axis line of the bearing unit.

3. The case component of a transaxle according to claim 1, further comprising: ribs extending along respective rims of the bent wall portions.

4. The case component of a transaxle according to claim 1, further comprising: ribs extending from a shaft center side of the bearing unit toward a shaft center side of the bolt hole portions on respective protruding portions of the bent wall portions.

* * * * *